Dec. 6, 1966 J. H. DUIMELAAR 3,290,451

CIRCUIT ARRANGEMENT FOR A TRANSMISSION SYSTEM

Filed March 11, 1963 2 Sheets-Sheet 1

INVENTOR

JASPER H. DUIMELAAR

BY

Frank R. Trifari

AGENT

INVENTOR
JASPER H. DUIMELAAR
BY
AGENT

United States Patent Office 3,290,451

Patented Dec. 6, 1966

3,290,451
CIRCUIT ARRANGEMENT FOR A TRANSMISSION SYSTEM

Jasper Hendrik Duimelaar, Hilversum, Netherlands, assignor to North American Philips Company, Inc., New York, N.Y., a corporation of Delaware Filed Mar. 11, 1963, Ser. No. 264,202
Claims priority, application Netherlands, Mar. 20, 1962, 276,178
4 Claims. (Cl. 179—175.3)

The invention relates to a circuit arrangement for a transmission system, for example, a carrier wave telephony system, for the transmission of signals between two terminal exchanges through a transmission line and intermediate amplifying stations. Each amplifier station is provided with a measuring oscillator for transmitting a measuring signal through the transmission line, each oscillator being connected to the input of the corresponding amplifier. Measuring signals produced by the measuring oscillators control an indicator which is arranged in a terminal exchange.

It is an object of the present invention to provide a circuit arrangement of the above-mentioned type, in which the measuring oscillators can be temporarily put into operation sequentially in a particularly simple manner.

According to the invention all the measuring oscillators associated with the amplifier stations are connected through a common control line to an adjustable direct-voltage source. In this arrangement a first threshold device is connected in series in the common control line between each pair of successive amplifier stations. The threshold levels of the first threshold devices, when the direct voltage of the direct-voltage source is increased, are successively exceeded by the direct voltage, as a result of which the threshold devices render the successive measuring oscillators operative in sequence. Each of the preceding measuring oscillators are also connected to the common control line by a parallel connected second threshold device. The threshold levels of the second threshold devices, when the direct voltage of the adjustable direct-voltage source is increased, are successively exceeded by the direct voltage, as a result of which the said second threshold devices render each measuring oscillator inoperative before the next measuring oscillator is put into operation.

A further simplification of the arrangement according to the invention is obtained by equipping the threshold voltages with Zener diodes.

Figure 1:
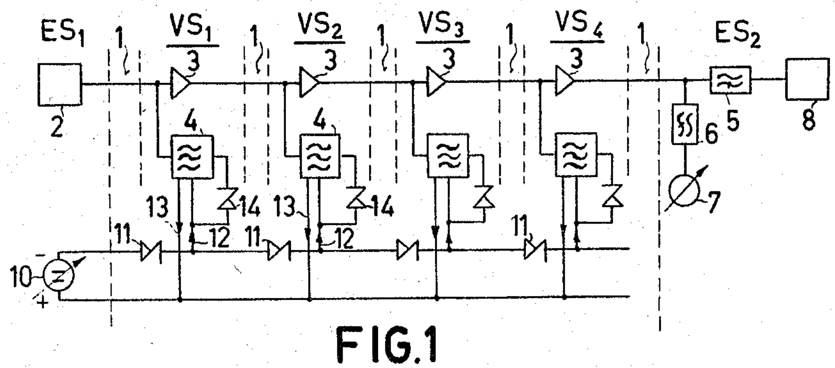
Figure 2:
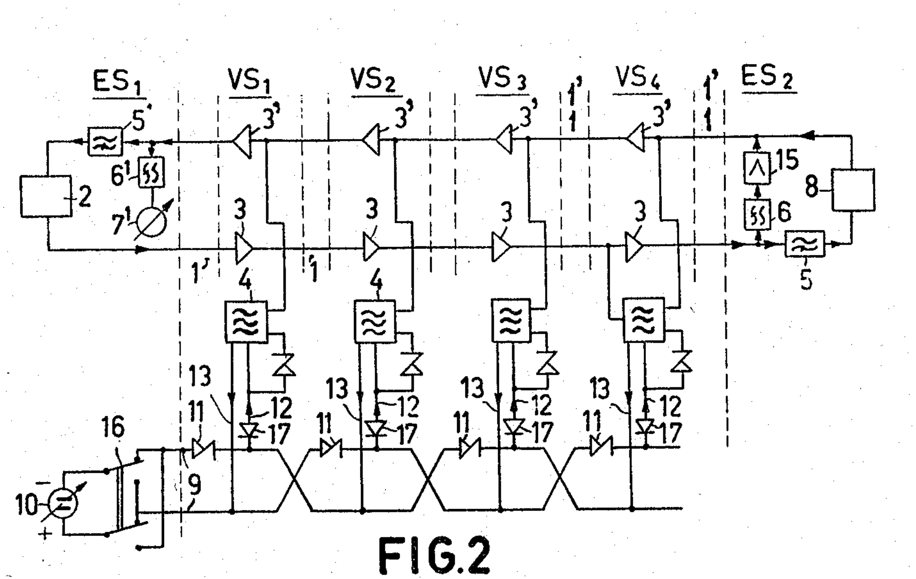
Figure 3:
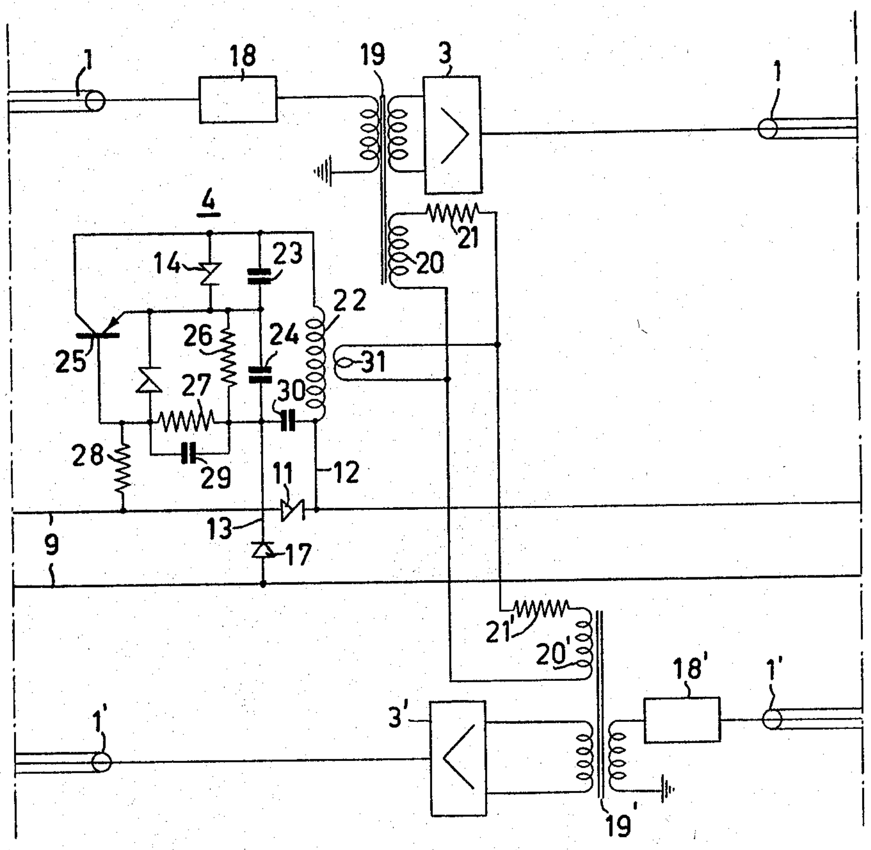

In order that the invention may readily be carried into effect, embodiments thereof will now be described, by way of example, with reference to the accompanying drawings, in which FIGURE 1 is a block diagram of a carrier telephony system provided with an arrangement in accordance with the invention;

FIGURE 2 is a block diagram of a carrier telephony system for two-way traffic between two terminal exchanges which is provided with a further arrangement in accordance with the invention, and FIGURE 3 is a circuit diagram of an amplifier station which may be used in the systems of FIGURES 1 and 2 between two terminal exchanges, the amplifier being provided with a measuring oscillator in accordance with the invention.

The carrier telephony system shown in FIGURE 1 is designed for the transmission of signals from a terminal exchange ES1 to a terminal exchange ES2 through a transmission line 1 which includes four amplifier stations VS1–VS4. The signals from the terminal apparatus 2 for a plurality of speech channels, for example, 960 speech channels, are applied through the transmission line 1 to the input of an amplifier 3 in the amplifier station VS1. The signals which are amplified by the amplifier 3 are appleid through the transmission line 1 to the input of an amplifier 3 in the amplifier station VS2 and so on. A measuring oscillator 4 which is connected to the input of the amplifier 3 is associated with each of the amplifier stations VS1–VS4. If in some known manner it is ascertained that the transmission of the signals from terminal exchange ES1 to terminal exchange ES2 is interrupted, the measuring oscillators 4 are successively put into operation from the terminal exchange ES1, starting with amplifier station VS1. In the operative condition the measuring oscillator 4 applies a measuring signal to the input of the amplifier 3, which applies the measuring signal through the transmission line 1 to the terminal exchange ES2. In this terminal exchange a high-pass filter 5 and a low-pass filter 6 are connected in parallel to the transmission line 1 to separate the signals taken from the transmission line 1. The low-pass filter 6 passes the signals produced by the measuring oscillators and applies them to an indicating device 7. The high pass filter 5 passes the remainder of the signals taken from the transmission line 1 and applies them to an output apparatus 8. The indicating device 7 responds on reception of a measuring signal produced by a measuring oscillator.

In order to locate an amplifier which has failed, the measuring oscillator 4 in the amplifier station VS1 is rendered operative and then inoperative from the terminal exchange ES1, after which the measuring oscillator in the amplifier station VS2 is put into operation, and so on. If one of the amplifiers 3, for example, the amplifier in the amplifier station VS3, has failed, the measuring signals produced by the measuring oscillators 4 in the amplifier stations VS1, VS2 and VS3 are not transmitted to the terminal exchange ES2. Consequently the indicating device 7 provides no indication. If finally the measuring oscillator 4 in the amplifier station VS4 is put into operation, the measuring signal produced by this oscillator is transmitted to the terminal exchange ES2 and indicated by the indicating device 7. Thus it can be deduced that the amplifier in the preceding amplifier station VS3 has failed.

According to the invention the measuring oscillators 4 are connected through a common control line 9 to an adjustable direct-voltage source 10. Between each pair of successive amplifier stations a threshold device 11 is connected in series in the control line. When the direct voltage of the adjustable direct-voltage source 10 is increased, the threshold levels of the threshold device 11 are exceeded in sequence. When its threshold level is exceeded, the threshold device 11 supplies a direct current to the associated measuring oscillator 4 through a lead 12, which direct current renders the measuring oscillator operative and flows back to the control lead through a lead 13. In the embodiment under consideration and that described hereinafter, the direction of the current flow is from the negative terminal to the positive terminal of the adjustable direct-voltage source. The measuring oscillators are also connected in parallel to the control line 9 through threshold devices 14. When the direct voltage of the adjustable direct-voltage source is further increased, it exceeds the threshold level of the threshold device 14 so that the associated measuring oscillator is rendered inoperative. The voltage at wihch the threshold level of the threshold device 14 is exceeded, is smaller than the voltage at which the threshold level of the next threshold device 11 is exceeded, so that each measuring oscillator is rendered inoperative before the next measuring oscillator is rendered operative.

The threshold devices shown in FIGURE 1 are provided with Zener diodes which are connected in the reverse direction with respect to the direct voltage applied to the control line by the adjustable direct-voltage source. These diodes have a threshold voltage in the reverse direction. When the applied direct voltage has a value below the threshold value, the diode is cut off and passes only a very slight leakage current. As soon as the voltage increases to exceed the threshold voltage, the Zener diode becomes conductive and in this condition the voltage drop across the diode is substantially constant. On increase of the direct voltage from the direct-voltage source 10 the Zener diode 11 connected between the terminal exchange ES1 and the amplifier station VS1 is first rendered conductive so that a constant voltage drop is produced across it. On further increase of the direct voltage, the current flowing through the line 12 increases to a value such that the measuring oscillator 4 is rendered operative. On still further increase of the direct voltage to a value such that the direct voltage applied to the control line is at least twice the threshold voltage of a Zener diode 11, the Zener diode 11 connected between the amplifier stations VS1 and VS2 becomes conductive. The threshold voltage of the Zener diode 14 is smaller than the threshold voltage of the Zener diode 11 so that now the diode 14 becomes conductive and renders the measuring oscillator 4 inoperative before the next Zener diode 11 becomes conductive. In order to render the Zener diode 11 connected between the amplifier stations VS3 and VS4 conductive, the direct voltage applied to the control line 9 has to be at least four times the threshold voltage of any one Zener diode.

The number of amplifier stations interposed between two terminal exchanges, which is four in the embodiment shown, is far greater in practice, for example, 32. Hence the direct voltage required from the source 10 is also comparatively high.

The carrier telephony system shown in FIGURE 2 is designed for the transmission of signals from a terminal exchange ES1 to a terminal exchange ES2 through a transmission line 1 and for the transmission in the return direction from the terminal exchange ES2 to the terminal exchange ES1 through a transmission line 1'. The transmission lines 1 and 1' include amplifiers 3 and 3' respectively, which are combined in pairs in amplifier stations VS1 to VS4. The measuring oscillators 4 included in the amplifier stations are connected not only to the inputs of the amplifiers 3 but also to the inputs of the amplifiers 3'. In order to enable a faulty amplifier to be located from one of the terminal exchanges irrespective of the fact whether it is included in the go transmission line 1 or in the return transmission line 1', in the terminal exchange ES2 the measuring signals derived from the incoming transmission line 1 by the low-pass filter 6 are applied through an amplifier 15 together with the signals taken from the output apparatus 8 to the outgoing transmission line 1'. In order to distinguish the measuring signals transmitted through the line 1 from the measuring signals directly transmitted by the line 1', the level of the former signals is raised by the amplifier 15. In the terminal exchange ES1 a high-pass filter 5' and a low-pass filter 6' are connected in parallel to the transmission line 1' to separate the signals transmitted through this line 1'. The low-pass filter 6' passes the measuring signals produced by the measuring oscillators and applies them to an indicating device 7'. The device indicates the presence of a measuring oscillator signal and its level. After it has been ascertained in some known manner that one of the amplifiers 3 or 3' has failed, the measuring oscillators 4 are successively put into temporary operation from the terminal exchange ES1. If an amplifier, for example, the amplifier 3 of the amplifier station VS2, has failed, a measuring signal having a low level is indicated by the indicating device 7' after the measuring oscillator 4 in the amplifier station VS1 has been rendered operative. When the measuring oscillator 4 in the amplifier station VS2 is rendered operative, a low-level measuring signal is also indicated. When the measuring oscillator in the amplifier station VS3 is rendered operative, however, a measuring signal having a high level is indicated, for in this case the measuring signal produced by the measuring oscillator 4 is transmitted through the amplifiers 3 in the stations VS3 and VS4 to the terminal exchange ES2 and, after amplification by the amplifier 15, returned with a high level to the terminal exchange ES1 through the transmission line 1'. Thus, if after a measuring oscillator in an amplifier station has been rendered operative a high-level measuring signal is received, this means that of the amplifiers connected in the go transmission line that forming part of the preceding amplifier station has failed.

If an amplifier, for example, the amplifier 3' in the amplifier station VS2 has failed, a low-level measuring signal is indicated by the indicating device 7' when the measuring oscillator 4 of the amplifier station VS1 is rendered operative. When the measuring oscillator 4 of the amplifier station VS2 is rendered operative, the indicating device 7' indicates no measuring signal at all. If when a measuring oscillator is rendered operative it is observed that the indicating device 7' does not indicate any measuring signal, this shows that the amplifier 3' of the same amplifier station included in the return transmission line has failed.

It should be noted that the amplifier 15 can be dispensed with by adjusting the level of the measuring oscillator signal supplied to the amplifier 3 in the go transmission line 1 to a value higher than that of the level of the measuring oscillator signal supplied to the amplifiers 3' in the return transmission line 1'.

As has been mentioned hereinbefore, with a large number of amplifier stations situated between two terminal exchanges the direct voltage required from the direct-voltage source 10 is comparatively great, for it has to be at least greater than the sum of the threshold voltages of the Zener diodes connected in series with the control line. In order to reduce the direct voltage required for a given number of amplifier stations, according to a further aspect of the invention the control line 9 is connected to the terminals of the adjustable direct-voltage source 10 through a change-over switch 16, the conductors of the control line being connected cross-wise between each two successive amplifier stations, while furthermore a unidirectionally conductive element, for example, a diode, is connected in each supply line 12 to a measuring oscillator 4. When the change-over switch 16 is in the position shown, the direct-voltage source 10 applies a voltage to the control line 9 in the reverse direction of the first and third Zener diodes 11, whereas the second and fourth Zener diodes are driven in the forward direction by this voltage. If, now, in order to render the measuring oscillator 4 in the amplifier station VS1 operative, the voltage of the voltage source 10 is increased, the first Zener diode 11 becomes conductive and a current for putting the oscillator into operation is caused to flow through a diode 17 in the line 12. Subsequently, to render the measuring oscillator 4 in the amplifier station VS2 operative, the switch 16 is thrown over so that the Zener diode 11 connected between the stations VS1 and VS2 becomes conductive and through the diode 17 supplies a current to the line 12. This current is returned to the voltage source 10 through a conductor 13 and the first Zener diode 11 conducting in the forward direction. The diode 12 in the preceding amplifying station VS1 then is non-conductive. By reversing the polarity of the voltage applied to the control line 9 in this manner, with a given number of amplifier stations, the maximum required direct voltage can be reduced by one half.

FIGURE 3 shows in greater detail an amplifier station connected between two terminal exchanges. The signals taken from the end of the transmission line 1' connected to the amplifier station are applied through an equalizing network 18' to an input transformer 19' of the amplifier 3' which after amplification transmits them to the end of the transmission line 1' connected to the next amplifier station. Similarly the signals taken from the transmission line 1 are applied through a smoothing network 18 to an input transformer 19 of the amplifier 3, which after amplification applies them to the end of the transmission line 1 connected to the next station. The input transformers 19 and 19' of the amplifiers 3 and 3' are provided with additional windings 20 and 20' respectively which through resistors 21 and 21' respectively are coupled to an output winding 31 of the measuring oscillator 4. This measuring oscillator contains a frequency determining resonant circuit 22–23–24 the ends of which are connected between the collector and the base of a transistor 25. The voltage taken from the junction of the capacitors 23 and 24 is returned to the emitter of the transistor to provide feedback of the oscillator. Resistors 26, 27 and 28 cause the transistor to be set to a predetermined desired operating point. Capacitors 29 and 30, which block direct current, form a roundabout way for the oscillator oscillation at, for example, 56 kc./s. If the direct voltage applied to the control line 9 on the left-hand side exceeds the threshold voltage of a Zener diode 11, this diode supplies a current to the transistor 25 through the line 12 and the inductance 22 and causes the oscillator to start oscillating. When the direct voltage is further increased, the measuring oscillator 4 continues oscillating until the collector-emitter voltage of the transistor 25 exceeds the threshold voltage of the Zener diode 14 connected between the said electrodes. When the threshold voltage is exceeded, the Zener diode 14 acts as a short circuit for the capacitor 23 so that the measuring oscillator ceases oscillating. If the direct voltage applied to the control line 9 is further increased, an excessive forward voltage is likely to be set up between the emitter and the base. In order to avoid an excessive forward voltage a Zener diode is connected in the reverse direction between the emitter and the base. It should be noted that in the embodiment shown the diode 17 is connected in the return lead 13 of the measuring oscillator and not in the supply lead 12, as shown in FIGURE 2, but this makes no difference in circuitry.

What is claimed is:

1. A transmission system for the transmission of information signals between first and second terminal stations, comprising a transmission line extending between said terminal stations, said transmission line comprising a plurality of amplifier stages, and means for testing said line to determine the location of faults, said testing means comprising a separate oscillator connected to each of said amplifier stages, a source of variable direct voltage, threshold circuit means connecting said source to said oscillators whereby said oscillators are successively rendered operative as the voltage of said source is increased, and separate threshold means connected to each oscillator whereby each oscillator is rendered inoperative before the next succeeding oscillator is rendered operative as the voltage of said source is increased.

2. In a transmission system for the transmission of information signals between first and second terminal stations, of the type wherein a transmission line having a plurality of amplifier stages is provided to interconnect said terminal stations, means for testing said transmission line to determine the location of faults therein, said testing means comprising a separate oscillator connected to each of said amplifier stages for applying measuring oscillations to said transmission line, a common source of variable operating voltage for said oscillators, and means for connecting said oscillators to said source comprising a common supply line, a plurality of first threshold devices serially connected in said supply line, means connecting said oscillators successively to said threshold devices whereby said oscillators are successively operative as said voltage is increased, and a separate second threshold device connected to each oscillator for rendering the respective oscillator inoperative before the next succeeding oscillator is rendered operative by an increase in said voltage.

3. In a transmission system for the transmission of information signals between first and second terminal stations, of the type wherein a transmission line having a plurality of amplifier stages is provided to interconnect said terminal stations, means for testing said transmission line to determine the location of faults therein, said testing means comprising a separate oscillator connected to each of said amplifier stages for applying measuring oscillations to said transmission line, a common source of variable operating voltage for said oscillators, said source having first and second terminals, a series circuit of a plurality of series-connected first Zener diodes, means connecting one end of said series circuit to said first terminal, means connecting each oscillator between said second terminal and a separate junction of first Zener diodes, whereby said oscillators are rendered successively operative as said voltage is increased, and a separate second Zener diode connected to each of said oscillators, whereby each oscillator is rendered inoperative before the next succeeding oscillator oscillates as said voltage is increased.

4. The system of claim 3 in which said oscillators are transistor oscillators with collector to emitter feedback, wherein said second Zener diodes are connected between the emitter and collector of the transistor of the respective oscillator.

No references cited.

KATHLEEN H. CLAFFY, *Primary Examiner.*

F. N. CARTEN, *Assistant Examiner.*